(12) United States Patent
Kawata et al.

(10) Patent No.: US 9,997,902 B2
(45) Date of Patent: Jun. 12, 2018

(54) OVERCURRENT PROTECTION CIRCUIT AND SWITCHING POWER APPARATUS USING THE SAME

(71) Applicant: Rohm Co., Ltd., Kyoto (JP)

(72) Inventors: Shinji Kawata, Kyoto (JP); Keita Itohara, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 290 days.

(21) Appl. No.: 14/886,296

(22) Filed: Oct. 19, 2015

(65) Prior Publication Data

US 2016/0111868 A1   Apr. 21, 2016

(30) Foreign Application Priority Data

Oct. 21, 2014   (JP) ................... 2014-214472

(51) Int. Cl.
*H02H 3/10*  (2006.01)

(52) U.S. Cl.
CPC .............. *H02H 3/10* (2013.01); *H02H 3/105* (2013.01)

(58) Field of Classification Search
CPC .................... H02H 3/10; H02H 3/105
See application file for complete search history.

(56) References Cited

U.S. PATENT DOCUMENTS

| 2011/0058285 A1* | 3/2011 | Wibben | H02M 1/32 361/18 |
| 2014/0217963 A1* | 8/2014 | Su | H02H 9/025 320/107 |

FOREIGN PATENT DOCUMENTS

JP   2009-268289   11/2009

* cited by examiner

*Primary Examiner* — Scott Bauer
(74) *Attorney, Agent, or Firm* — Fish & Richardson P.C.

(57) ABSTRACT

An overcurrent protection circuit includes a voltage monitoring part configured to monitor an output voltage generated from a periodic switching operation of a switching output stage or a feedback voltage corresponding to the output voltage, a current monitoring part configured to monitor whether a current flowing through the switching output stage is under an overcurrent condition, and a protection operation part configured to perform an overcurrent protection operation in response to monitoring results of both the voltage monitoring part and the current monitoring part.

9 Claims, 8 Drawing Sheets

OVERCURRENT PROTECTION CIRCUIT AND SWITCHING POWER APPARATUS USING THE SAME

CROSS-REFERENCE TO RELATED APPLICATION

This application is based upon and claims the benefit of priority from Japanese Patent Application No. 2014-214472, filed on Oct. 21, 2014, the entire contents of which are incorporated herein by reference.

TECHNICAL FIELD

The present disclosure relates to an overcurrent protection circuit and a switching power apparatus using the overcurrent protection circuit.

BACKGROUND

FIG. 6 is a circuit diagram illustrating a switching power apparatus 20 in the related art. The switching power apparatus 20 includes a switching output stage 21 configured to generate an output voltage VOUT by stepping down an input voltage VIN by driving a coil 213 in response to ON/OFF operations of an output transistor 211, a control circuit 22 configured to drive the switching output stage 21 by generating a gate signal G1 of the output transistor 211, and an overcurrent protection circuit 23 configured to perform an overcurrent protection operation by monitoring an coil current IL flowing through the coil 213 of the switching output stage 21.

Furthermore, either a pulse-by-pulse operation or an off-latch operation is generally employed as an overcurrent protection operation. In the pulse-by-pulse operation, a forced stop and a self-reset of a switching operation are repeated in each period. Therefore, even if an overcurrent is detected and an operation for switching the output transistor 211 is forcefully stopped in a certain period, an operation for switching the output transistor 211 is self-reset (self-return or resumed) in a next period. Incidentally, in an off-latch operation, if an overcurrent is detected, an operation for switching the output transistor 211 is forcefully stopped for at least a plurality of periods (in some cases, until power is applied again or an external reset is performed).

FIGS. 7A and 7B are diagrams illustrating merits and demerits of a pulse-by-pulse operation. As described above, in a pulse-by-pulse operation, even if an overcurrent is detected and the output transistor 211 is forcefully turned OFF in a certain period, change of an output voltage VOUT associated with an overcurrent protection operation may be suppressed to be relatively small since the output transistor 211 is essentially turned ON in a next period. Therefore, even if an overcurrent protection is temporarily activated due to a change of an AC load, the output voltage VOUT may be maintained (refer to FIG. 7A).

However, if, for example, an output terminal of the output voltage VOUT is ground-faulted via a low impedance path (short-circuit to a ground terminal or a low potential terminal equivalent thereto), a decrease ΔIL of a coil current IL during a forced OFF period of the output transistor 211 (determined in correspondence to VOUT/L) is small and the forced OFF period of the output transistor 211 is short (a period of a switching operation at the maximum), overcurrent protection cannot be sufficiently activated and the coil current IL continues to increase (refer to FIG. 7B).

FIGS. 8A and 8B are diagrams illustrating merits and demerits of an off-latch operation. As described above, in an off-latch operation, the output transistor 211 is forcefully turned OFF for a long period after detection of an overcurrent. Therefore, even if an output terminal of the output voltage VOUT is ground-faulted, overcurrent protection may be sufficiently activated (refer to FIG. 8B).

However, if an overcurrent protection is temporarily activated due to an event like a change of an AC load, the output transistor 211 is forcefully and unnecessarily turned off for a long period, the output voltage VOUT is stepped down significantly (refer to FIG. 8A).

SUMMARY

The present disclosure provides some embodiments of an overcurrent protection circuit capable of performing a suitable overcurrent protection operation and a switching power apparatus using the same.

According to one embodiment of the present disclosure, an overcurrent protection circuit includes a voltage monitoring part configured to monitor an output voltage generated from a periodic switching operation of a switching output stage or a feedback voltage corresponding to the output voltage, a current monitoring part configured to monitor whether a current flowing through the switching output stage is under an overcurrent condition, and a protection operation part configured to perform an overcurrent protection operation in response to monitoring results of both the voltage monitoring part and the current monitoring part (first configuration).

Furthermore, in the overcurrent protection circuit having the first configuration, the protection operation part is configured to generate an overcurrent protection signal to perform a pulse-by-pulse operation for repeating a forced stop and a self-reset of the switching operation per period based on a monitoring result of the current monitoring part when the output voltage or the feedback voltage is greater than a threshold voltage and to perform an off-latch operation for forcibly stopping the switching operation for at least a plurality of periods after detecting that the current is under the overcurrent condition when the output voltage or the feedback voltage is smaller than the threshold voltage (second configuration).

Furthermore, in the overcurrent protection circuit having the second configuration, the voltage monitoring part includes a first comparator configured to compare the output voltage or the feedback voltage to a first threshold voltage and generate a first detection signal (third configuration).

Furthermore, in the overcurrent protection circuit having the third configuration, the current monitoring part includes a second comparator configured to compare a sense voltage corresponding to the current to a second threshold voltage and generate a second detection signal (fourth configuration).

Furthermore, in the overcurrent protection circuit having the fourth configuration, the current monitoring part further includes a sense resistor configured to generate the sense voltage by current-to-voltage converting the current (fifth configuration).

Furthermore, in the overcurrent protection circuit having the fourth or fifth configuration, the protection operation part includes a signal delaying part configured to switch the overcurrent protection signal to a logical level corresponding to the detection of the overcurrent condition when the second detection signal is switched to a logical level corresponding to the detection of the overcurrent condition and maintain the overcurrent protection signal at the logical level corresponding to the detection of the overcurrent condition for a delay time longer than a period of the switching operation, and a signal path switching part configured to determine whether to insert the signal delaying part between an input terminal of the second detection signal and an output terminal of the overcurrent protection signal based on the first detection signal and switch based on the determination result (sixth configuration).

Furthermore, in the overcurrent protection circuit having the sixth configuration, the signal delaying part is configured to set the delay time based on the output voltage or the feedback voltage (seventh configuration).

Furthermore, in the overcurrent protection circuit having any one of the first to seventh configurations, the current is selected from a group consisting of a coil current flowing in a coil, a switching current flowing through an output transistor, and an output current flowing to a load (eighth configuration).

According to another embodiment of the present disclosure, provided is a switching power apparatus including a switching output stage configured to generate an output voltage from an input voltage by driving a coil in response to ON/OFF operations of an output transistor, a control circuit configured to drive the switching output stage, and the overcurrent protection circuit having any one of the first to eighth configurations (ninth configuration).

According to another embodiment of the present disclosure, provided is an electronic apparatus including the switching power apparatus having the ninth configuration (tenth configuration).

DETAILED DESCRIPTION

<Switching Power Apparatus>

Figure 1:
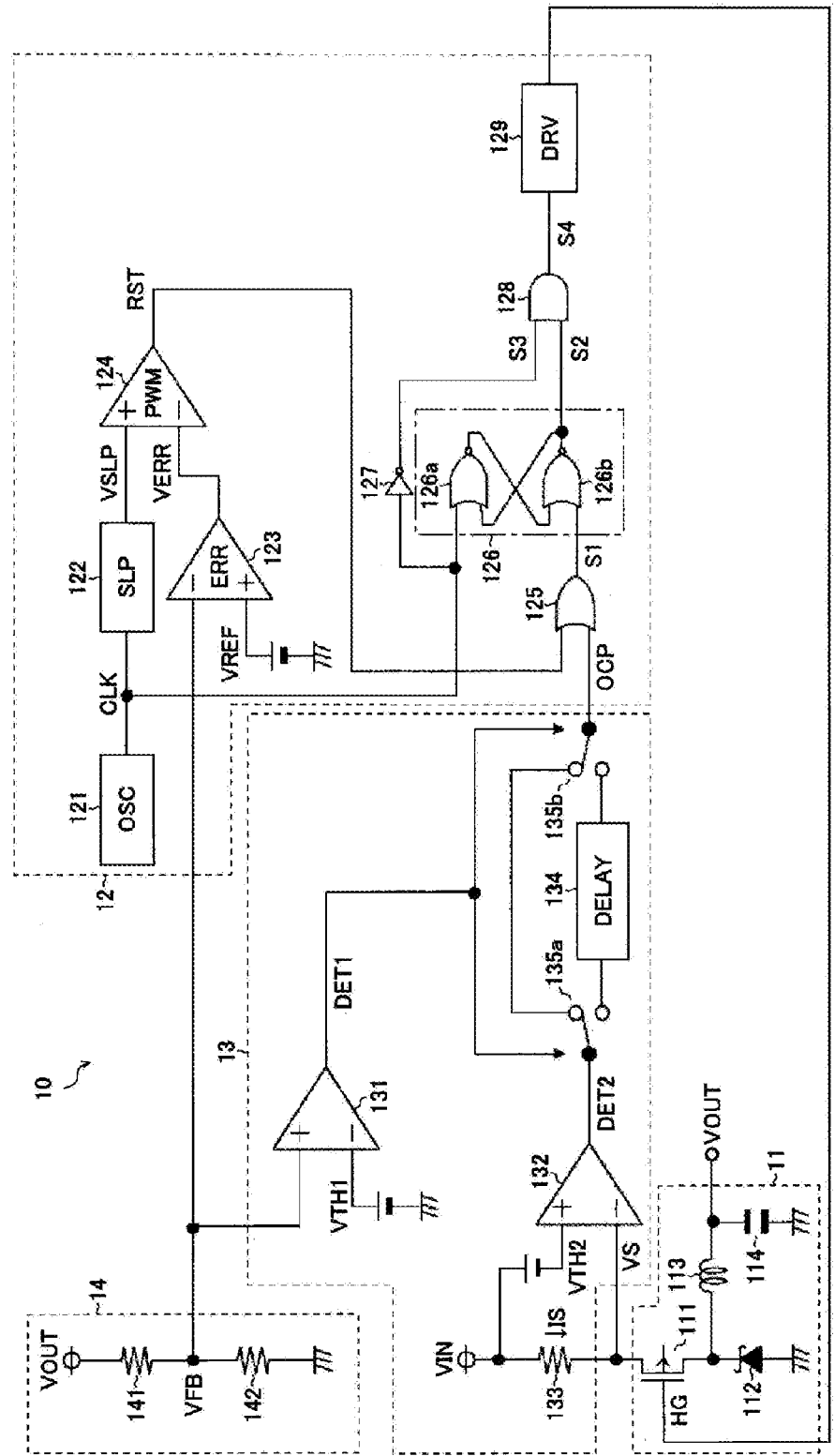
FIG. 1 is a block diagram illustrating a switching power apparatus according to an embodiment of the present disclosure.

FIG. 1 is a block diagram illustrating a switching power apparatus 10 according to an embodiment of the present disclosure. The switching power apparatus 10 according to the present embodiment includes a switching output stage 11, a control circuit 12, an overcurrent protection circuit 13, and a feedback voltage generating circuit 14.

The switching output stage 11 includes an output transistor 111 (in the present embodiment, a P channel type metal oxide semiconductor (MOS) field effect transistor), a rectification diode 112, a coil 113, and a smoothing capacitor 114. The switching output stage 11 generates a desired output voltage VOUT by stepping down an input voltage VIN by driving a coil 113 in response to periodic switching operations (ON/OFF) of an output transistor 111.

Connection configurations between the respective circuit components constituting the switching output stage 11 will be described below. A gate of the output transistor 111 is connected to an application terminal of a gate signal HG (an output terminal of a gate driver 129 described below). A source of the output transistor 111 is connected to an input terminal of the input voltage VIN via a sense resistor 133 described below. A drain of the output transistor 111 is connected to a cathode of the rectification diode 112 and a first terminal of the coil 113. An anode of the rectification diode 112 is connected to the ground terminal. A second terminal of the coil 113 is connected to an output terminal of the output voltage VOUT and a first terminal of the smoothing capacitor 114. A second terminal of the smoothing capacitor 114 is connected to the ground terminal.

Furthermore, in the switching output stage 11, an N channel type MOS field-effect transistor may be employed as the output transistor 111. Furthermore, a synchronous rectifying transistor may be employed instead of the rectification diode 112. Furthermore, output type may be a boost type or a step up/down type.

The control circuit 12 pulse-width-modulation (PWM) drives the switching output stage 11 by generating a gate signal HG of the output transistor 111. The control circuit 12 includes an oscillator 121, a slope voltage generating part 122, an error amplifier 123, a PWM comparator 124, an OR gate 125, a RS flip-flop 126, an INV gate 127, an AND gate 128, and a gate driver 129.

The oscillator 121 generates a clock signal CLK in a certain period T.

The slope voltage generating part 122 generates a slope voltage VSLP in the form of triangular waves or sawtooth waves in synchronization with the clock signal CLK.

The error amplifier 123 generates an error voltage VERR corresponding to a difference between a reference voltage VREF input to a non-inverting input terminal (+) and a feedback voltage VFB input to an inverting input terminal (−) (corresponding to a divided voltage of the output voltage VOUT). The error voltage VERR increases when the feedback voltage VFB is lower than the reference voltage VREF and decreases when the feedback voltage VFB is higher than the reference voltage VREF.

The PWM comparator 124 compares the slope voltage VSLP input to the non-inverting input terminal (+) to the error voltage VERR input to the inverting input terminal (−) and generates a reset signal RST. The reset signal RST becomes high level when the slope voltage VSLP is higher than the error voltage VERR and becomes low level when the slope voltage VSLP is lower than the error voltage VERR.

The OR gate 125 generates a logical sum signal S1 between the reset signal RST and an overcurrent protection signal OCP. The logical sum signal S1 becomes high level when at least one of the reset signal RST and the overcurrent protection signal OCP becomes high level and becomes low level when at least one of the reset signal RST and the overcurrent protection signal OCP becomes low level.

The RS flip-flop 126 is a type of sequence circuit which receives inputs of the clock signal CLK and the logical sum signal S1 and generates a latch signal S2 and includes NOR gates 126a and 126b. A first input terminal of the NOR gate 126a is connected to an application terminal of the clock signal CLK. A second input terminal of the NOR gate 126a is connected to an output terminal of the NOR gate 126b. A first input terminal of the NOR gate 126b is connected to an output terminal of the NOR gate 126a. A second input terminal of the NOR gate 126b is connected to an application terminal of the logical sum signal S1. Furthermore, the latch signal S2 is set to high level at the rising edge of the clock signal CLK and is reset to low level at the rising edge of the logical sum signal S1.

The INV gate 127 generates an inverted clock signal S3 by logically inverting the clock signal CLK.

The AND gate 128 generates a logical product signal S4 between the latch signal S2 and the inverted clock signal S3. The logical product signal S4 becomes low level when at least one of the latch signal S2 and the inverted clock signal S3 becomes low level and becomes high level when both the latch signal S2 and the inverted clock signal S3 become high level.

The gate driver 129 receives an input of the logical product signal S4 and generates the gate signal HG. When the logical product signal S4 is high level, the gate signal HG becomes low level and the output transistor 111 is turned ON. Incidentally, when the logical product signal S4 is low level, the gate signal HG becomes high level and the output transistor 111 is turned OFF.

Furthermore, a method whereby the control circuit 12 drives the switching output stage 11 is not limited to the PWM method, and any of various methods including a pulse frequency modulation (PFM method) may be employed.

The overcurrent protection circuit 13 is a circuit block for performing an overcurrent protection operation when a current to be monitored IS flowing in the switching output stage 11 becomes an overcurrent and includes comparators 131 and 132, a sense resistor 133 (resistance value: RS), a signal delaying part 134, and signal path switching parts 135a and 135b.

The comparator 131 compares the feedback voltage VFB input to the non-inverting input terminal (+) to a first threshold voltage VTH1 input to the inverting input terminal (−) (e.g., VTH1=VREF×0.75) and generates a first detection signal DET1. The first detection signal DET1 becomes high level (logical level when no ground-fault is detected) when the feedback voltage VFB is higher than the first threshold voltage VTH1 and becomes low level (logical level when a ground-fault is detected) when the feedback voltage VFB is lower than the first threshold voltage VTH1. Furthermore, a short circuit protection (SCP) comparator for ground-fault protection that is already included in the switching power apparatus 10 may be employed as the comparator 131.

The comparator 132 compares a sense voltage VS (=VIN−IS×RS) input to the inverting input terminal (−) to a second threshold voltage VTH2 (=VIN−Ith×RS, where Ith denotes overcurrent detection threshold value) input to the non-inverting input terminal (+) and generates a second detection signal DET2. The second detection signal DET2 becomes low level (logical level when no ground-fault is detected) when the sense voltage VS is higher than the second threshold voltage VTH2 and becomes high level (logical level when a ground-fault is detected) when the sense voltage VS is lower than the second threshold voltage VTH2. In other words, the second detection signal DET2 becomes low level when the current to be monitored IS is smaller than the overcurrent detection threshold value Ith and becomes high level when the current to be monitored IS is greater than the overcurrent detection threshold value Ith.

The sense resistor 133 is interconnected between an application terminal of the input voltage VIN and a source of the output transistor 111 and generates the sense voltage VS corresponding to the current to be monitored IS by current/voltage-transforming the current to be monitored IS flowing to the sense resistor 133. The sense voltage VS that occurs at a low potential terminal of the sense resistor 133 (a node for a connection between the sense resistor 133 and a source of the output transistor 111) is a voltage that is lower than the input voltage VIN by an amount of a voltage stepped down at the sense resistor 133. Therefore, as the current to be monitored IS increases, the sense voltage VS becomes lower. Incidentally, as the current to be monitored IS decreases, the sense voltage VS becomes higher. Furthermore, the current to be monitored IS is not limited to a switching current flowing in the output transistor 111 and may be a coil current flowing in the coil 113 or an output current flowing in a load. Furthermore, a method of sensing the current to be monitored IS is not limited to a technique for monitoring an amount of a voltage stepped down at the sense resistor 133 arranged on a flowing path of the current to be monitored IS. For example, a technique for monitoring an amount of a voltage stepped down at the output transistor 111 (or a current monitoring transistor connected thereto in parallel) may be employed.

The signal delaying part 134 generates the overcurrent protection signal OCP by applying a certain signal delay at the fall-down timing of the second detection signal DET2. In detail, the signal delaying part 134 immediately switches the overcurrent protection signal OCP to high level (logical level when an overcurrent is detected) when the second detection signal DET2 becomes high level (logical level when an overcurrent is detected), and then the signal delaying part 134 maintains the overcurrent protection signal OCP at the high level (logical level when an overcurrent is detected) for a delay time TDLY that is longer than a period T of a switching operation. In other words, the signal delaying part 134 may be a pulse generating part that generates one shot pulse having a pulse width TDY with respect to the overcurrent protection signal OCP with the rising edge of the second detection signal DET2.

Furthermore, the signal delaying part 134 may be configured to set a delay time TDLY in correspondence to the output voltage VOUT or the feedback voltage VFB. For example, a configuration for setting the delay time TDLY to a first delay time TDLY1 when VREF×0.5 VFB<VREF×0.75 and setting the delay time TDLY to a second delay time TDLY2 longer than the first delay time TDLY1 when VFB<VREF×0.5 may be suggested. By employing such a configuration, the lower the output voltage VOUT or the feedback voltage VFB is, the longer an off-latch time of a switching operation described below may become. Therefore, an optimal overcurrent protection operation may be performed in correspondence to a degree of a ground-fault.

The signal path switching parts 135a and 135b switch whether to insert the signal delaying part 134 or not between an input terminal of the second detection signal DET2 and an output terminal of the overcurrent protection signal OCP in correspondence to the first detection signal DET1.

In detail, when the first detection signal DET1 is high level (logical level when no ground-fault is detected), the input terminal of the second detection signal DET2 and the output terminal of the overcurrent protection signal OCP are directly bypass-connected by the signal path switching parts 135a and 135b. Therefore, when no ground-fault is detected, the second detection signal DET2 is output as the overcurrent protection signal OCP, and thus a pulse-by-pulse operation (detailed descriptions thereof will be given below) is performed as an overcurrent protection operation.

On the contrary, when the first detection signal DET1 is low level (logical level when a ground-fault is detected), the signal delaying part 134 is inserted between the input terminal of the second detection signal DET2 and the output terminal of the overcurrent protection signal OCP by the signal path switching parts 135a and 135b. Therefore, when a ground-fault is detected, the overcurrent protection signal OCP is generated by applying a certain delay to the second detection signal DET2, and thus an off-latch operation is performed as an overcurrent protection operation (detailed descriptions thereof will be given below).

Furthermore, from among the above-stated circuit components, the comparator 131 functions as a voltage monitoring part that monitors the feedback voltage VFB, whereas the comparator 132 and the sense resistor 133 function as a current monitoring part that monitors whether the current to be monitored IS is an overcurrent (IS>Ith). Furthermore, the signal delaying part 134 and the signal path switching parts 135a and 135b function as a protection operation part for performing an overcurrent protection in correspondence to results detected by the voltage monitoring part and the current monitoring part.

Particularly, the protection operation part generates the overcurrent protection signal OCP to perform a pulse-by-pulse operation for repeating a forced stop and a self-return of the switching operation in a certain period when the output voltage VOUT or the feedback voltage VFB is higher than the first threshold voltage VTH1 and to perform an off-latch operation for forcefully stopping a switching operation for at least a plurality of periods from overcurrent state of the current to be monitored IS when the output voltage VOUT or the feedback voltage VFB is lower than the first threshold voltage VTH1. Detailed descriptions thereof will be given below.

The feedback voltage generating circuit 14 includes resistors 141 and 142 that are serially interconnected between an application terminal of the output voltage VOUT and the ground terminal (resistance values: R1 and R2) and outputs the feedback voltage VFB from connection nodes of the resistor 141 and the resistor 142 by dividing the output voltage VOUT by a certain division ratio $\alpha$ (=R2/(R1+R2)). Furthermore, if the output voltage VOUT is low (if the output voltage VOUT is within an input dynamic range of the error amplifier 123 or the comparator 131), the feedback voltage generating circuit 14 may be omitted and the output voltage VOUT may be input directly to the error amplifier 123 or the comparator 131.

Overcurrent Protection Operation (First Embodiment)

Figure 2:
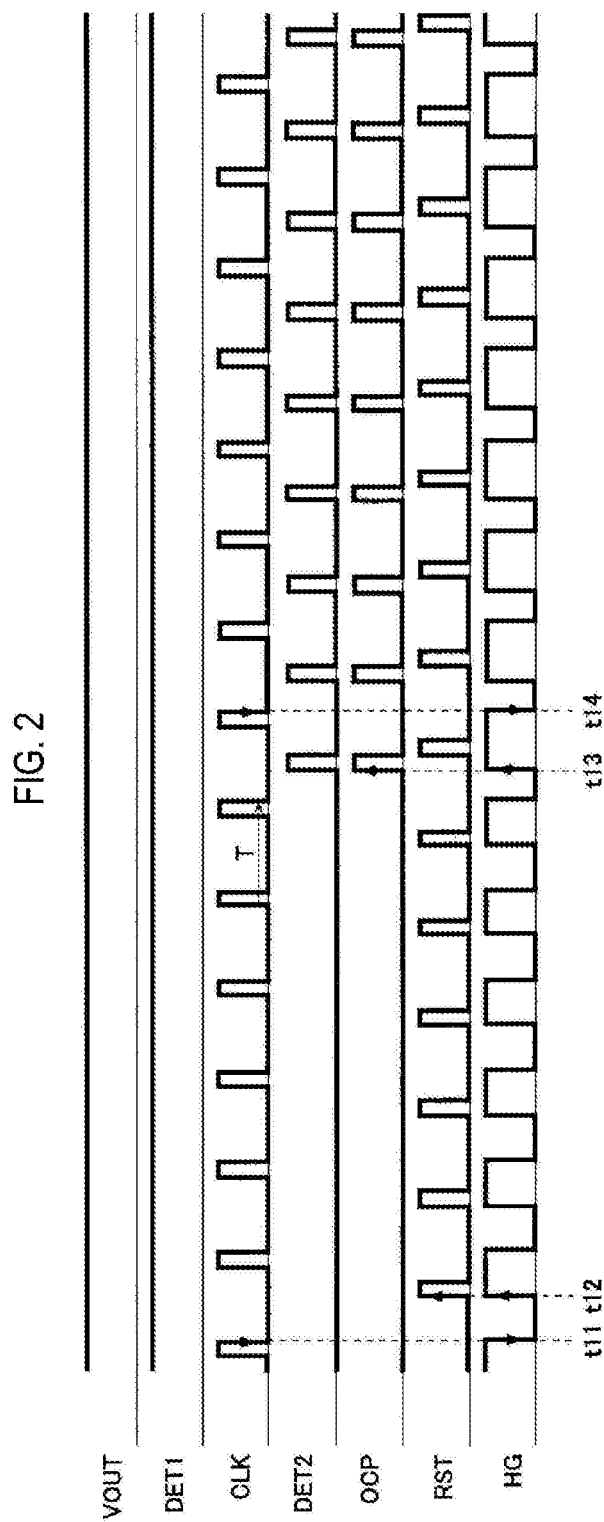
FIG. 2 is a timing chart illustrating a first embodiment of overcurrent protection operations.

FIG. 2 is a timing chart illustrating a first embodiment of overcurrent protection operations (a pulse-by-pulse operation when no ground-fault is detected), where the output voltage VOUT, the first detection signal DET1, the clock signal CLK, the second detection signal DET2, the overcurrent protection signal OCP, the reset signal RST, and the gate signal HG are illustrated from above in the order stated.

At the normal state without a detection of neither a ground-fault nor an overcurrent (DET1=H, DET2=L), every time the fall-down edge of the clock signal CLK comes, the gate signal HG becomes low level and the output transistor 111 is turned ON. Next, every time the rising edge of the reset signal RST comes, the gate signal HG becomes high level and the output transistor 111 is turned OFF (refer to a time point t11 and a time point t12).

Incidentally, if the current to be monitored IS becomes an overcurrent during the ON period of the output transistor 111 (low level period of the gate signal HG), the second detection signal DET2 steps up to high level before the rising edge of the reset signal RST comes, and thus the overcurrent protection signal OCP becomes high level (refer to a time point t13).

As a result, the gate signal HG steps up to high level at the rising edge of the overcurrent protection signal OCP, and thus the output transistor 111 is forcefully turned OFF without waiting for the rising edge of the reset signal RST. At this time, the current to be monitored IS flowing in the output transistor 111 is blocked due to the forced OFF of the output transistor 111, and thus the second detection signal DET2 immediately falls down to low level.

Here, if a ground-fault of the output voltage VOUT is not detected (DET1=H), the second detection signal DET2 is output as the overcurrent protection signal OCP. Therefore, when the second detection signal DET2 falls down to low level in response to forced OFF of the output transistor 111, the overcurrent protection signal OCP immediately falls down to low level as well. As a result, since a process for masking the clock signal CLK performed by the RS flip-flop 126 and the AND gate 128 becomes invalid, the gate signal HG becomes low level at the fall-down edge of the clock signal CLK in a next period, and thus the output transistor 111 is turned ON again (refer to a time point t14).

As described above, if the current to be monitored IS becomes an overcurrent when no ground-fault of the output voltage VOUT occurs, a pulse-by-pulse operation for repeating a forced OFF and a self-reset of a switching operation in a certain period is performed. Therefore, even if an overcurrent protection is temporarily activated due to a change of an AC load, change of the output voltage VOUT may be suppressed.

Overcurrent Protection Operation (Second Embodiment)

Figure 3:
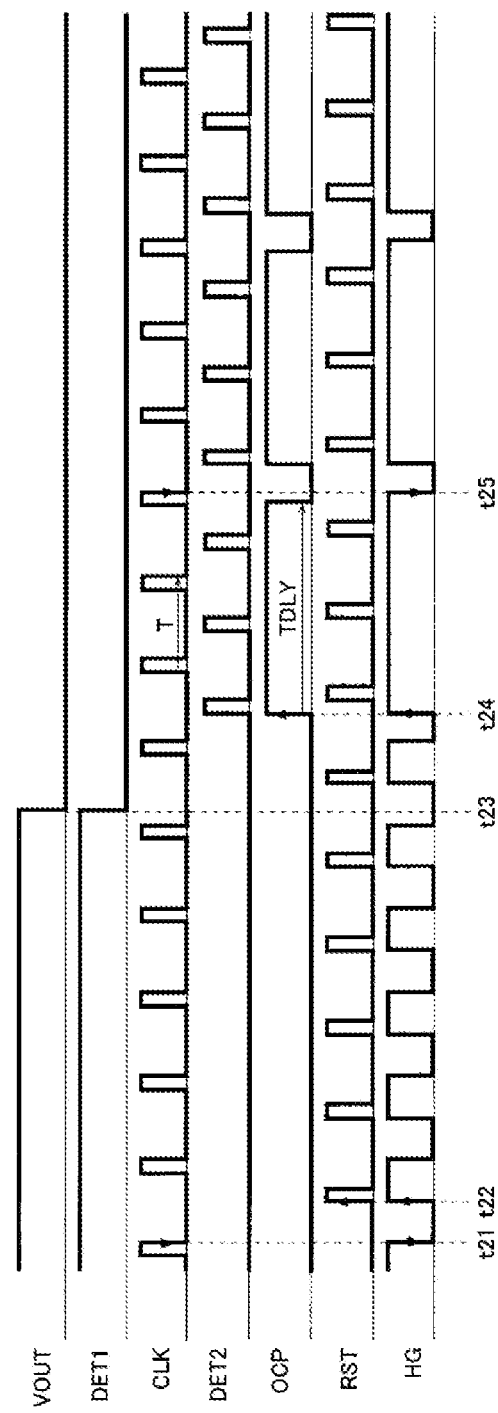
FIG. 3 is a timing chart illustrating a second embodiment of overcurrent protection operations.

FIG. 3 is a timing chart illustrating a second embodiment of overcurrent protection operations (off-latch operation when a ground-fault is detected) and illustrates the output voltage VOUT, the first detection signal DET1, the clock signal CLK, the second detection signal DET2, the overcurrent protection signal OCP, the reset signal RST, and the gate signal HG from above in the order stated.

At the normal state without a detection of neither a ground-fault nor an overcurrent (DET1=H, DET2=L), every time the fall-down edge of the clock signal CLK comes (every period T), the gate signal HG becomes low level and the output transistor 111 is turned ON. Next, every time the rising edge of the reset signal RST comes, the gate signal HG becomes high level and the output transistor 111 is turned OFF (refer to a time point t21 and a time point t22).

Incidentally, if the current to be monitored IS becomes an overcurrent during the ON period of the output transistor 111 (low level period of the gate signal HG), the second detection signal DET2 steps up to high level before the rising edge of the reset signal RST comes, and thus the overcurrent protection signal OCP becomes high level (refer to a time point t24).

As a result, the gate signal HG steps up to high level at the rising edge of the overcurrent protection signal OCP, and thus the output transistor 111 is forcefully turned OFF without waiting for the rising edge of the reset signal RST. At this time, the current to be monitored IS flowing in the output transistor 111 is blocked due to the forced OFF of the output transistor 111, and thus the second detection signal DET2 immediately falls down to low level.

The above-stated operations are basically identical to those in the first embodiment (FIG. 2). However, according to the second embodiment shown in FIG. 3, a ground-fault of the output voltage VOUT is detected at a time point t23, and thus the first detection signal DET1 falls down to low level. As described above, when a ground-fault of the output voltage VOUT is detected (DET1=L), the signal delaying part 134 is inserted between the input terminal of the second detection signal DET2 and the output terminal of the overcurrent protection signal OCP, the overcurrent protection signal OCP is generated by delaying the fall-down timing of the second detection signal DET2 by the delay time TDLY.

In other words, when a ground-fault is detected (DET1=L), the second detection signal DET2 falls down to low level based on forced OFF of the output transistor 111. The overcurrent protection signal OCP is maintained at high level for the delay time TDLY (>T). As a result, since a process for masking the clock signal CLK performed by the RS flip-flop 126 and the AND gate 128 becomes valid, even if the fall-down edge of the clock signal CLK comes in a next period, the forced OFF of the output transistor 111 is maintained for a plurality of periods (refer to time points t24 to t25).

As described above, if the current to be monitored IS becomes an overcurrent when a ground-fault of the output voltage VOUT occurs, an off-latch operation for forcefully turning the output transistor 111 OFF for a plurality of periods after the overcurrent protection is detected, and thus the overcurrent protection may be sufficiently suppressed.

<Application to Television>

Figure 4:
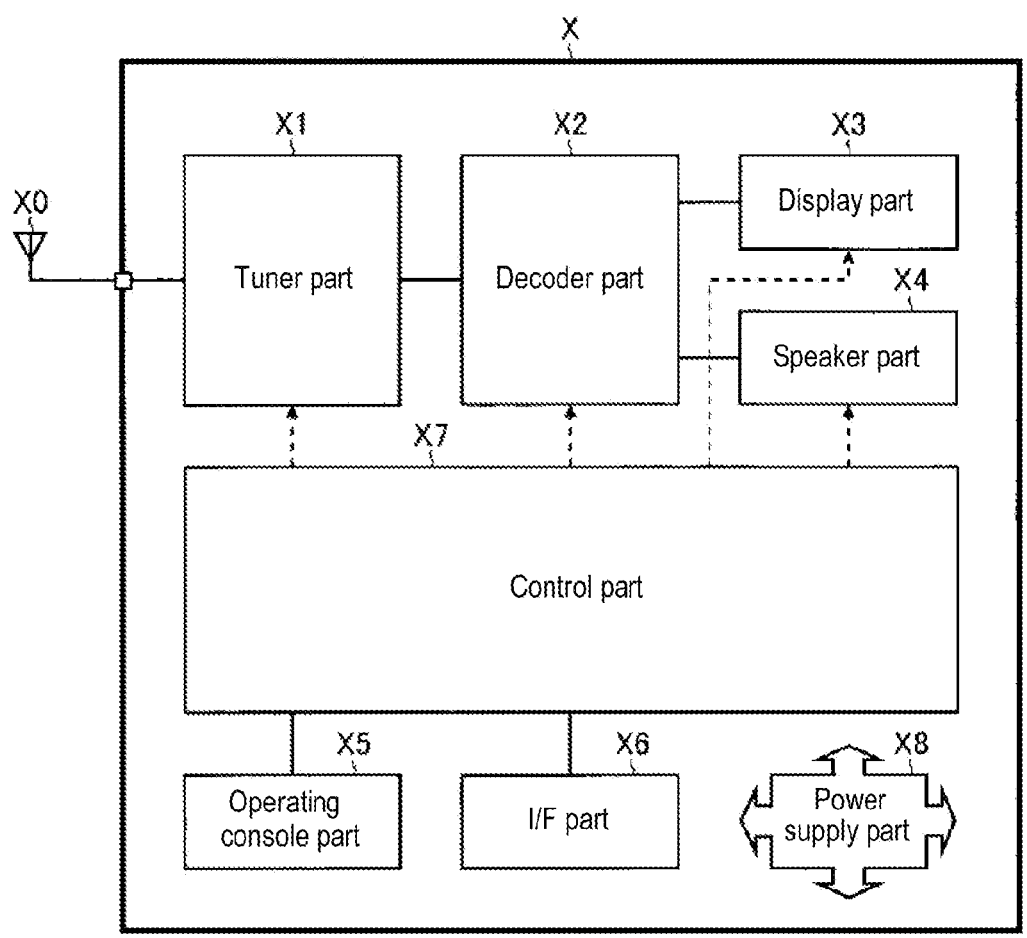
FIG. 4 is a block diagram illustrating a television employing a switching power apparatus according to an embodiment of the present disclosure.
Figure 5A:
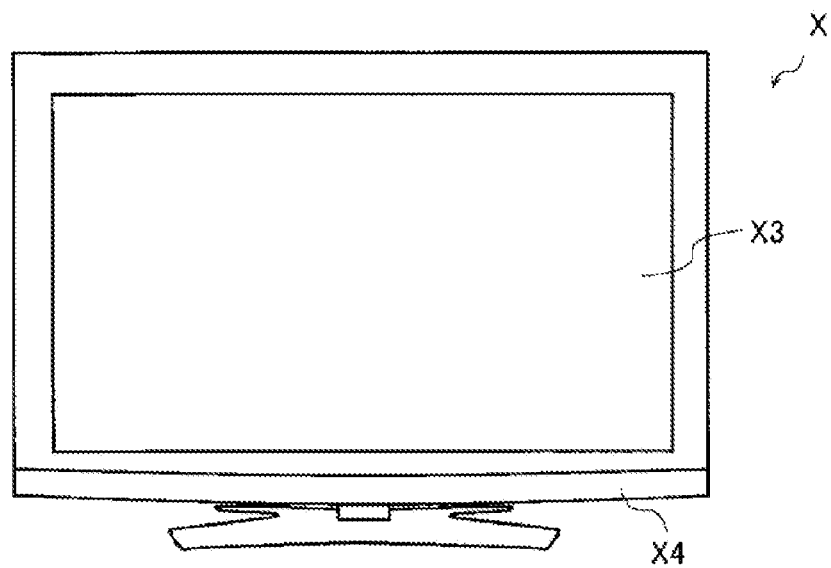
FIG. 5A is a front view of a television including a switching power apparatus.
Figure 5B:
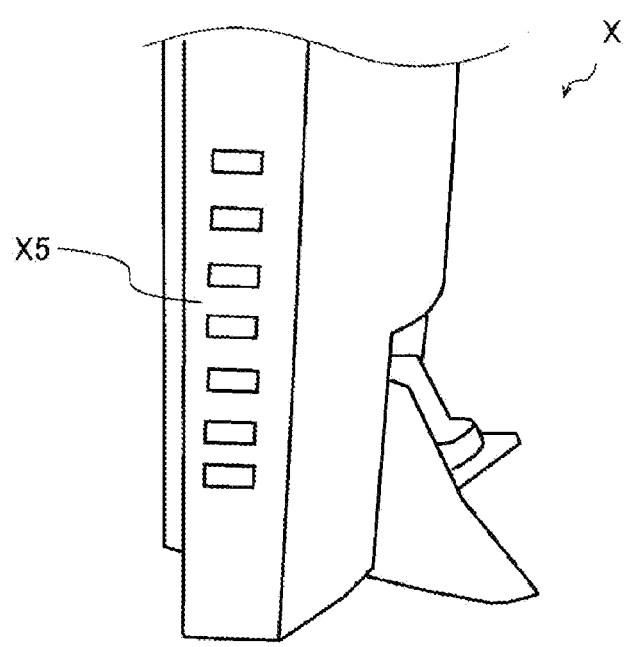
FIG. 5B is a lateral view of a television including a switching power apparatus.
Figure 5C:
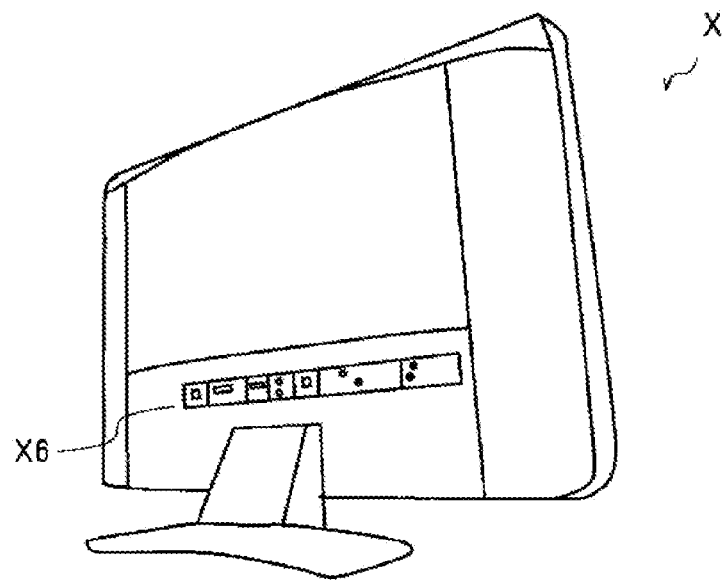
FIG. 5C is a rear view of a television including a switching power apparatus.
Figure 6:
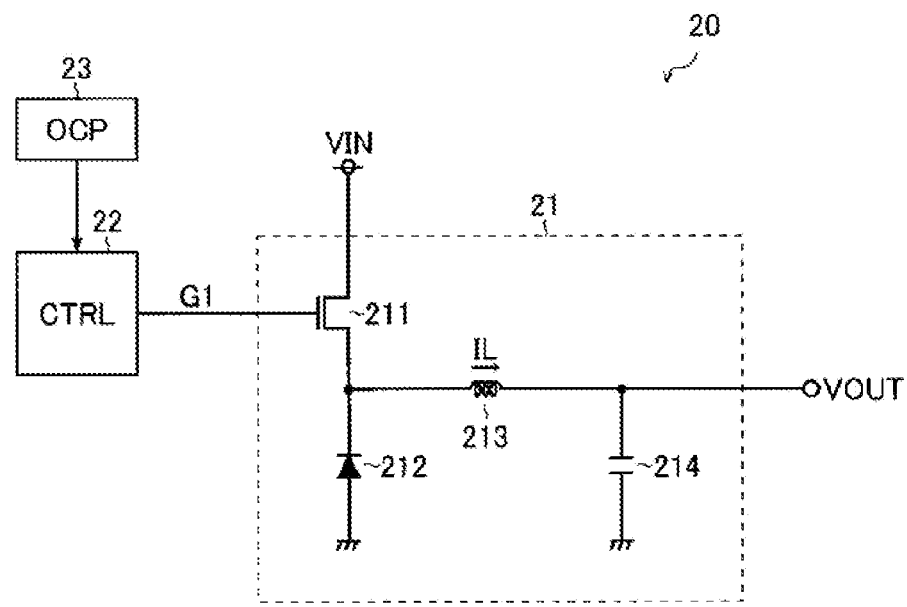
FIG. 6 is a circuit diagram illustrating a switching power apparatus in the related art.
Figure 7A:
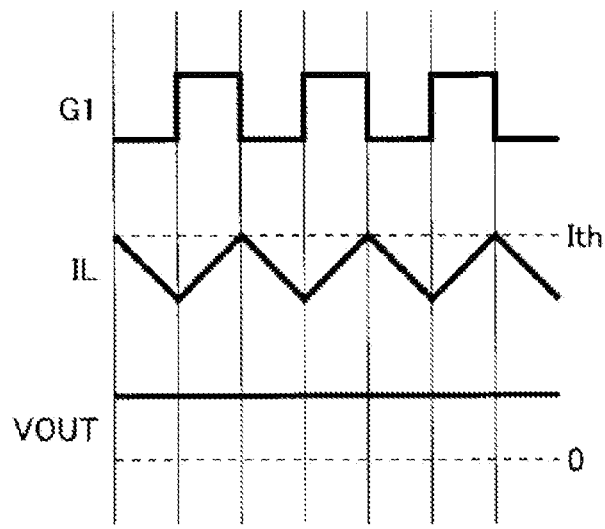
FIGS. 7A and 7B are diagrams illustrating merits and demerits of a pulse-by-pulse operation.
Figure 7B:
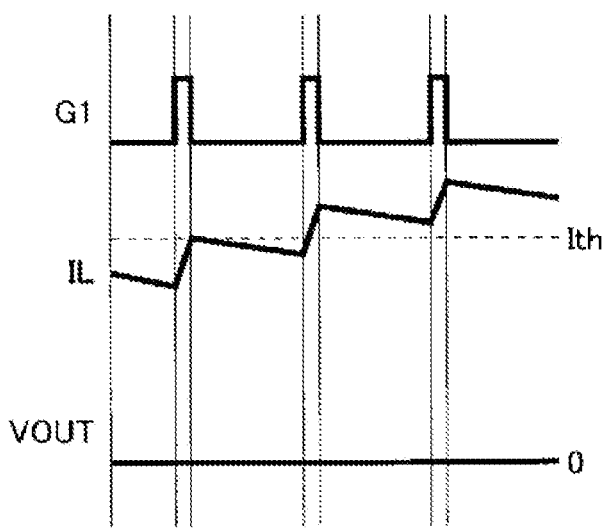
Figure 8A:
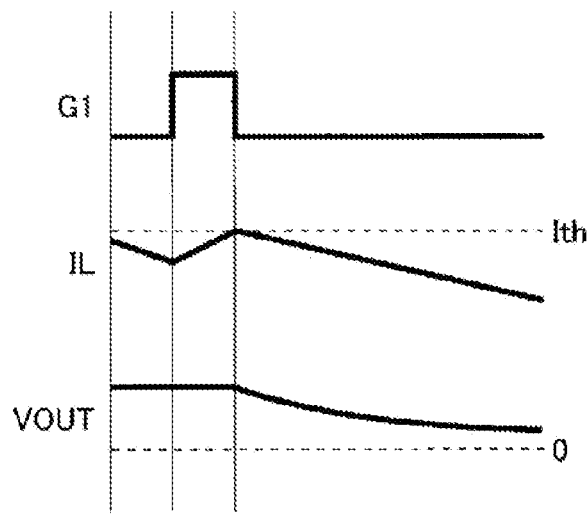
FIGS. 8A and 8B are diagrams illustrating merits and demerits of an off-latch operation.
Figure 8B:
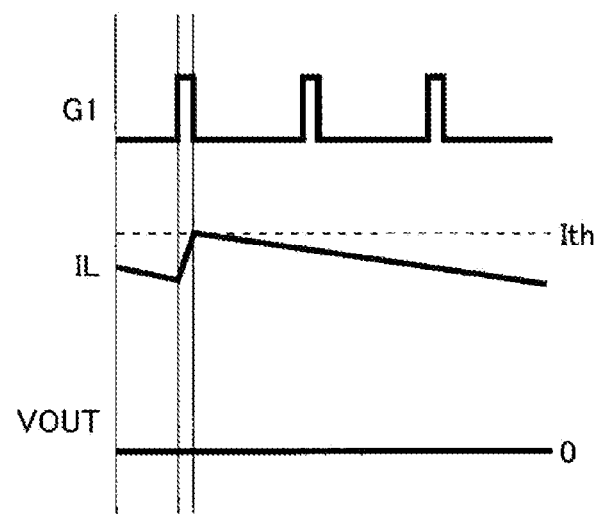

FIG. 4 is a block diagram illustrating a television X employing a switching power apparatus according to an embodiment of the present disclosure. Furthermore, FIGS. 5A to 5C are a front view, a lateral view, and a rear view of the television X including the switching power apparatus. The television X according to the present embodiment includes a tuner part X1, a decoder part X2, a display part X3, a speaker part X4, an operating console part X5, an interface part X6, a control part X7, and a power supply part X8.

The tuner part X1 selects broadcasting signals of a desired channel from among broadcasting signals received by an antenna X0 externally connected to the television X.

The decoder part X2 generates video signals and audio signals from the broadcasting signal selected by the tuner part X1. Furthermore, the decoder part X2 also has a function for generating video signals and audio signals based on externally input signals from the interface part X6.

The display part X3 outputs the video signals generated by the decoder part X2 as a video.

The speaker part X4 outputs the audio signals generated by the decoder part X2 as an audio.

The operating console part X5 is a human interface for receiving user operations. Buttons, switches, or a remote controller may be employed as the operating console part X5.

The interface part X6 is a frontend for receiving external input signals from an external apparatus (e.g., an optical disc player, a hard disk drive, etc.).

The control part X7 controls overall operations of the above-stated components X1 to X6. A central processing unit (CPU) may be employed as the control part X7.

The power supply part X8 supplies powers to the above-stated components X1 to X7. The above-stated switching power apparatus 10 may be favorably employed as the power supply part X8.

Other Modified Embodiments

While some embodiments have been described, these embodiments have been presented by way of example only, and are not intended to limit the scope of the disclosures. Indeed, the novel methods and apparatuses described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

According to the embodiments of the present disclosure, it is possible to provide an overcurrent protection circuit capable of performing a suitable overcurrent protection operation and a switching power apparatus using the same.

INDUSTRIAL APPLICABILITY

For example, the present disclosure may be applied to switching power apparatuses included in various electronic apparatuses (e.g., a smart phone, a tablet terminal, a LCD television, a DVD recorder, a laptop computer, and various types of monitors).

What is claimed is:

1. An overcurrent protection circuit comprising:
   a voltage monitoring part configured to monitor an output voltage generated from a periodic switching operation of a switching output stage or a feedback voltage corresponding to the output voltage;
   a current monitoring part configured to monitor whether a current flowing through the switching output stage is under an overcurrent condition; and
   a protection operation part configured to perform an overcurrent protection operation in response to monitoring results of both the voltage monitoring part and the current monitoring part,
   wherein the protection operation part is configured to generate an overcurrent protection signal to perform a pulse-by-pulse operation for repeating a forced stop and a self-reset of the switching operation per period based on a monitoring result of the current monitoring part when the output voltage or the feedback voltage is greater than a threshold voltage and to perform an off-latch operation for forcibly stopping the switching operation for at least a plurality of periods after detecting that the current is under the overcurrent condition when the output voltage or the feedback voltage is smaller than the threshold voltage.

2. The overcurrent protection circuit of claim 1, wherein the voltage monitoring part comprises a first comparator configured to compare the output voltage or the feedback voltage to a first threshold voltage and generate a first detection signal.

3. The overcurrent protection circuit of claim 2, wherein the current monitoring part comprises a second comparator configured to compare a sense voltage corresponding to the current to a second threshold voltage and generate a second detection signal.

4. The overcurrent protection circuit of claim 3, wherein the current monitoring part further comprises a sense resistor configured to generate the sense voltage by current-to-voltage converting the current.

5. The overcurrent protection circuit of claim 3, wherein the protection operation part comprises:
   a signal delaying part configured to switch the overcurrent protection signal to a logical level corresponding to the detection of the overcurrent condition when the second detection signal is switched to a logical level corresponding to the detection of the overcurrent condition and maintain the overcurrent protection signal at the logical level corresponding to the detection of the overcurrent condition for a delay time longer than a period of the switching operation; and
   a signal path switching part configured to determine whether to insert the signal delaying part between an input terminal of the second detection signal and an output terminal of the overcurrent protection signal based on the first detection signal and switch based on the determination result.

6. The overcurrent protection circuit of claim 5, wherein the signal delaying part is configured to set the delay time based on the output voltage or the feedback voltage.

7. The overcurrent protection circuit of claim 1, wherein the current is selected from a group consisting of a coil current flowing in a coil, a switching current flowing through an output transistor, and an output current flowing to a load.

8. A switching power apparatus comprising:
   a switching output stage configured to generate an output voltage from an input voltage by driving a coil in response to ON/OFF operations of an output transistor;
   a control circuit configured to drive the switching output stage; and
   the overcurrent protection circuit of claim 1.

9. An electronic apparatus comprising the switching power apparatus of claim 8.

* * * * *